US 6,710,835 B2

(12) United States Patent
Kurahashi et al.

(10) Patent No.: US 6,710,835 B2
(45) Date of Patent: Mar. 23, 2004

(54) LIQUID CRYSTAL DISPLAY DEVICE WITH STACKED INSULATING FILM OF DIFFERENT LAYERS

(75) Inventors: Nagatoshi Kurahashi, Mobara (JP); Yoshiaki Nakayoshi, Ooami (JP); Masahiro Ishii, Mobara (JP)

(73) Assignee: Hitachi, Ltd., Tokyo (JP)

( * ) Notice: Subject to any disclaimer, the term of this patent is extended or adjusted under 35 U.S.C. 154(b) by 44 days.

(21) Appl. No.: 10/035,146

(22) Filed: Jan. 4, 2002

(65) Prior Publication Data
US 2002/0101555 A1 Aug. 1, 2002

(30) Foreign Application Priority Data
Jan. 29, 2001 (JP) ........................ 2001-019809

(51) Int. Cl.⁷ ................ G02F 1/1343; G02F 1/1333; G02F 1/136
(52) U.S. Cl. ................ 349/141; 349/43; 349/138
(58) Field of Search ............... 349/42, 43, 138, 349/141

(56) References Cited

U.S. PATENT DOCUMENTS

| | | | | |
|---|---|---|---|---|
| 6,005,648 A | * | 12/1999 | Zhang et al. | 349/43 |
| 6,469,765 B1 | * | 10/2002 | Matsuyama et al. | 349/143 |
| 2001/0046027 A1 | * | 11/2001 | Tai et al. | 349/159 |
| 2001/0048498 A1 | * | 12/2001 | Tomioka et al. | 349/123 |
| 2002/0149729 A1 | * | 10/2002 | Nishimura et al. | 349/141 |

* cited by examiner

*Primary Examiner*—Tarifur R. Chowdhury
(74) *Attorney, Agent, or Firm*—Antonelli, Terry, Stout & Kraus, LLP

(57) ABSTRACT

A liquid crystal display device that is capable of restraining image retention includes, a counter electrode formed in a layer overlying the pixel electrode with a stacked insulating film interposed therebetween. The counter electrode is made of a plurality of stripe-shaped counter electrodes which are disposed so as to extend in one direction and to be juxtaposed in a direction transverse to the one direction, and the pixel electrode is made of a transparent plane-shaped electrode, which is formed in a large part of the pixel area.

13 Claims, 8 Drawing Sheets

LIQUID CRYSTAL DISPLAY DEVICE WITH STACKED INSULATING FILM OF DIFFERENT LAYERS

BACKGROUND OF THE INVENTION

The present invention relates to a liquid crystal display device and, more particularly, to a liquid crystal display device of the In-Plane Switching Mode type.

A liquid crystal display device of the In-Plane Switching Mode type has a construction in which a pixel electrode and a counter electrode are formed in each liquid-crystal-side pixel area of one of two substrates disposed in opposition to each other with a liquid crystal material interposed therebetween, so that the optical transmissivity of the liquid crystal material is controlled by a component approximately parallel to the substrates, which component is contained in an electric field generated between the pixel electrode and the counter electrode.

One known type of such a liquid crystal display device has a construction in which a pixel electrode and a counter electrode are respectively formed in different layers with an insulating film interposed therebetween and either one of the pixel and counter electrodes is formed as a transparent electrode approximately over the whole of each pixel area, while the other is formed as a plurality of stripe-shaped transparent electrodes which are disposed approximately over the whole of each pixel area in such a manner as to extend in one direction and to be juxtaposed in a direction transverse to the one direction.

Such a device is described in detail in, for example, K. Tarumi, M. Bremer, and B. Schuler, IEICE TRANS. ELECTRON., VOL. E79-C No. 8, pp. 1035–1039, AUGUST 1996.

Incidentally, a so-called active matrix system is applied to such a liquid crystal display device; for example, each of its pixel areas is surrounded by a pair of adjacent gate signal lines disposed so as to extend in the x direction and to be juxtaposed in the y direction and by a pair of adjacent drain signal lines disposed so as to extend in the y direction and to be juxtaposed in the x direction. Each of the pixel areas is provided with a switching element driven by the supply of a scanning signal from one of the adjacent gate signal lines, and a video signal is supplied to a pixel electrode of the pixel area from one of the adjacent drain signal lines via this switching element.

SUMMARY OF THE INVENTION

However, it has been pointed out that a liquid crystal display device constructed in the above-described manner easily suffers from image retention due to an electric field approximately perpendicular to the substrates, which is contained in the electric field generated between the pixel electrode and the counter electrode. In addition, a further improvement in the aperture ratio of the liquid crystal display device has been desired.

The present invention has been made in view of the above-described problem, and provides a liquid crystal display device in which image retention does not easily occur.

The invention also provides a liquid crystal display device in which the aperture ratio is improved.

Representative aspects of the invention disclosed in the present application will be described below in brief.

A liquid crystal display device according to the present invention includes, for example, in each pixel area on a liquid-crystal-side surface of one of substrates disposed in opposition to each other with a liquid crystal interposed therebetween, a thin film transistor to be driven by supply of a scanning signal from a gate signal line, a pixel electrode to be supplied with a video signal from a drain signal line via the thin film transistor, and a counter electrode which causes an electric field to be generated between the counter electrode and the pixel electrode. The counter electrode is formed in a layer overlying the pixel electrode with a stacked insulating film interposed between the counter electrode and the pixel electrode. The stacked insulating film is made of a stacked structure in which an insulating film including a part of a gate insulating film of the thin film transistor, an inorganic material layer and an organic material layer are stacked in that order. The counter electrode is made of a plurality of stripe-shaped counter electrodes which are disposed so as to extend in one direction and to be juxtaposed in a direction transverse to the one direction, and the pixel electrode is made of a transparent plane-shaped electrode which is formed in a large part of the pixel area.

In the liquid crystal display device constructed in this manner the insulating film interposed between the pixel electrode and the counter electrode has a stacked structure in which the inorganic material layer and the organic material layer are stacked in that order, whereby the dielectric constant of the insulating film can be made small and the thickness thereof can easily be made large. Accordingly image retention due to an electric field occurring in a direction approximately perpendicular to the substrates does not easily occur.

In the construction of the liquid crystal display device according to the invention, the plurality of counter electrodes are formed to extend approximately in parallel with the drain signal line and include a counter electrode which is superposed on the drain signal line and which has a central axis approximately coincident with a central axis of the drain signal line and is wider than the drain signal line.

In the liquid crystal display device constructed in this manner, since the counter electrode is formed so as to be superposed on an area in which the drain signal line is formed, an improvement in aperture ratio can be realized.

BRIEF DESCRIPTION OF THE DRAWINGS

The invention will become more readily appreciated and understood from the following detailed description of preferred embodiments of the invention when taken in conjunction with the accompanying drawings, in which.

DETAILED DESCRIPTION OF THE INVENTION

Preferred embodiments of a liquid crystal display device according to the invention will be described below with reference to the accompanying drawings.

Embodiment 1

<<Equivalent Circuit>>

Figure 2:
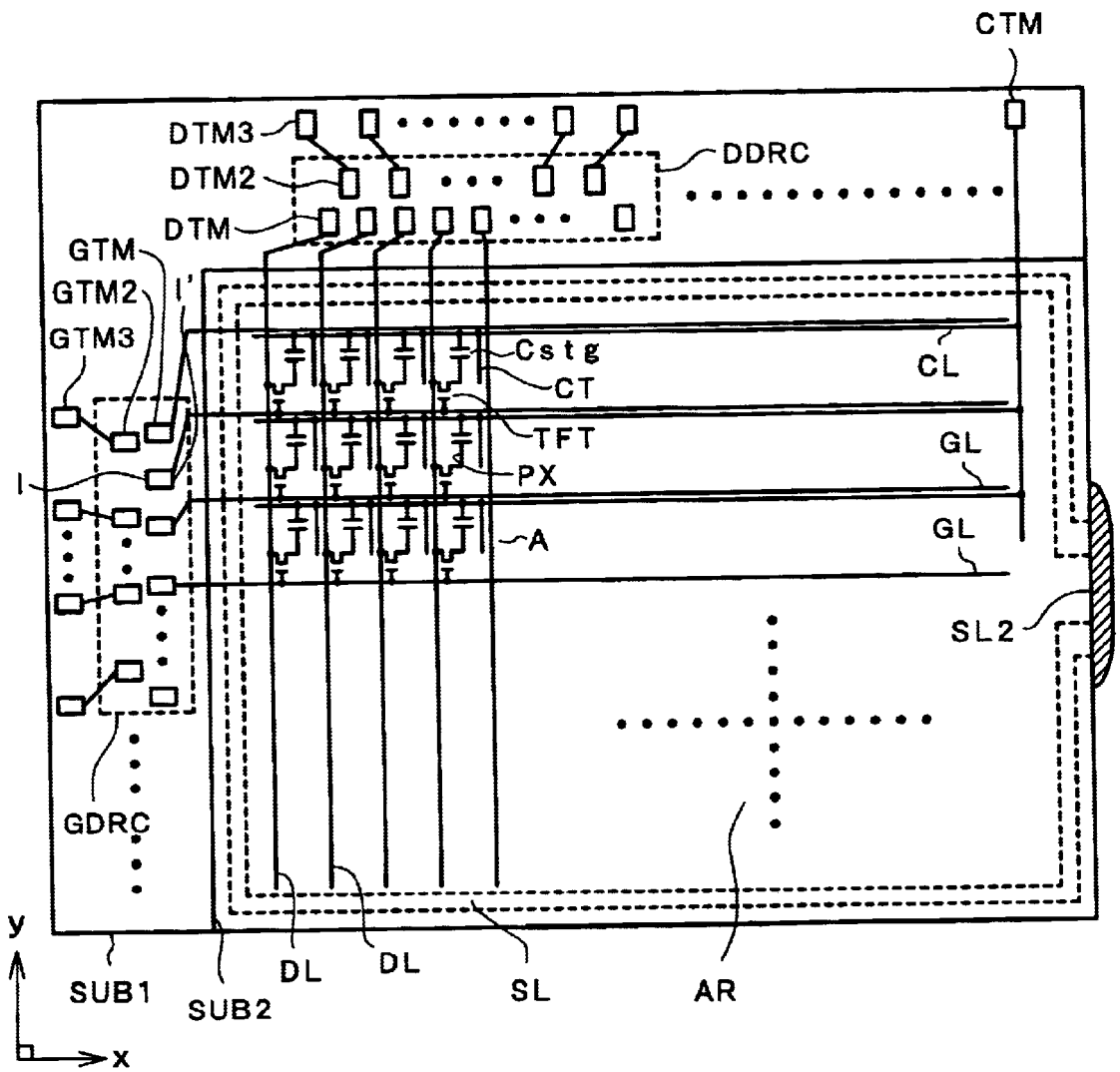
FIG. 2 is an equivalent circuit diagram showing the one embodiment of the liquid crystal display device according to the invention.

FIG. 2 is a schematic diagram showing the equivalent circuit of a liquid crystal display device according to the invention. FIG. 2 is an equivalent circuit diagram which corresponds to the actual geometrical layout of the liquid crystal display device.

FIG. 2 shows a transparent substrate SUB1 that is disposed in opposition to another transparent substrate SUB2, with a liquid crystal material being interposed therebetween.

Gate signal lines GL and drain signal lines DL are formed on a liquid-crystal-side surface of the transparent substrate SUB1. The gate signal lines GL are disposed so as to extend in the x direction and to be juxtaposed in the y direction, as viewed in FIG. 2, while the drain signal lines DL are insulated from the gate signal lines GL and are disposed so as to extend in the y direction and to be juxtaposed in the x direction, as viewed in FIG. 2. Rectangular areas, each of which is surrounded by a pair of adjacent gate signal lines GL and a pair of adjacent drain signal lines DL, constitute pixel areas, respectively, and a display part AR is formed by an aggregation of these pixel areas.

Counter voltage signal lines CL, which are disposed in parallel with the respective gate signal lines GL, are formed between the respective gate signal lines GL. Each of these counter voltage signal lines CL is supplied with a signal (voltage), which serves as a reference for a video signal (which will be described later), and, is connected to counter electrodes CT (which will be described later) in corresponding ones of the pixel areas, respectively.

A thin film transistor TFT and a pixel electrode PX are formed in each of the pixel areas. The thin film transistor TFT is driven by the supply of a scanning signal (voltage) from one of the adjacent gate signal lines GL, and a video signal (voltage) is supplied to the pixel electrode PX from one of the adjacent drain signal lines DL via the thin film transistor TFT.

A capacitance element Cstg is formed between the pixel electrode PX and the other of the adjacent gate signal lines GL so that when the thin film transistor TFT is turned off, a video signal supplied to the pixel electrode PX is stored for a long time by this capacitance element Cstg.

The pixel electrode PX in each of the pixel areas is arranged to cause an electric field having a component approximately parallel to the transparent substrate SUB1 to be generated between this pixel electrode PX and an adjacent one of the counter electrodes CT, thereby controlling the optical transmissivity of the liquid crystal material in the corresponding one of the pixel areas.

One end of each of the gate signal lines GL is formed so as to extend to one side (in FIG. 2, the left-hand side) of the transparent substrate SUB1, and the extended portion is formed as a terminal part GTM which is connected to bumps of a semiconductor integrated circuit GDRC consisting of a vertical scanning circuit mounted on the transparent substrate SUB1. In addition, one end of each of the drain signal lines DL is formed so as to extend to one side (in FIG. 2, the top side) of the transparent substrate SUB1, and the extended portion is formed as a terminal part DTM which is connected to bumps of a semiconductor integrated circuit DDRC consisting of a video signal driver circuit mounted on the transparent substrate SUB1.

The semiconductor integrated circuits GDRC and DDRC in themselves are completely mounted on the transparent substrate SUB1 by a technique which is called COG (chip on glass).

The input-side bumps of each of the semiconductor integrated circuits GDRC and DDRC are respectively connected to terminal parts GTM2 and DTM2 formed on the transparent substrate SUB1. These terminal parts GTM2 and DTM2 are respectively connected via individual interconnection layers to terminal parts GTM3 and DTM3 which are disposed in the peripheral portions of the transparent substrate SUB1 that are respectively closest to different side edges of the transparent substrate SUB1.

The counter voltage signal lines CL are connected in common at their ends (in FIG. 2 their right-hand ends) and extend to one side of the transparent substrate SUB1, and they are connected to a terminal part CTM.

The transparent substrate SUB2 is disposed in opposition to the transparent substrate SUB1 in such a manner as to avoid an area in which the semiconductor integrated circuits DDRC and GDRC are mounted. In this regard, the area of the transparent substrate SUB2 is smaller than that of the transparent substrate SUB1.

The transparent substrate SUB2 is secured to the transparent substrate SUB1 by a sealing material SL formed in the periphery of the transparent substrate SUB2, and this sealing material SL also has the function of sealing the liquid crystal between the transparent substrates SUB1 and SUB2.

Incidentally, the above description has referred to a liquid crystal display device of the type which uses a COG method, but the invention can also be applied to a liquid crystal display device of the type which uses a TCP method. In the TCP method, a semiconductor integrated circuit is formed by a tape carrier method, and the output terminals of the semiconductor integrated circuit are respectively connected to terminal parts formed on the transparent substrate SUB1, while the input terminals of the semiconductor integrated circuit are respectively connected to terminal parts on a printed circuit board which is disposed close to the transparent substrate SUB1.

<<Construction of a Pixel>>

Figure 1:
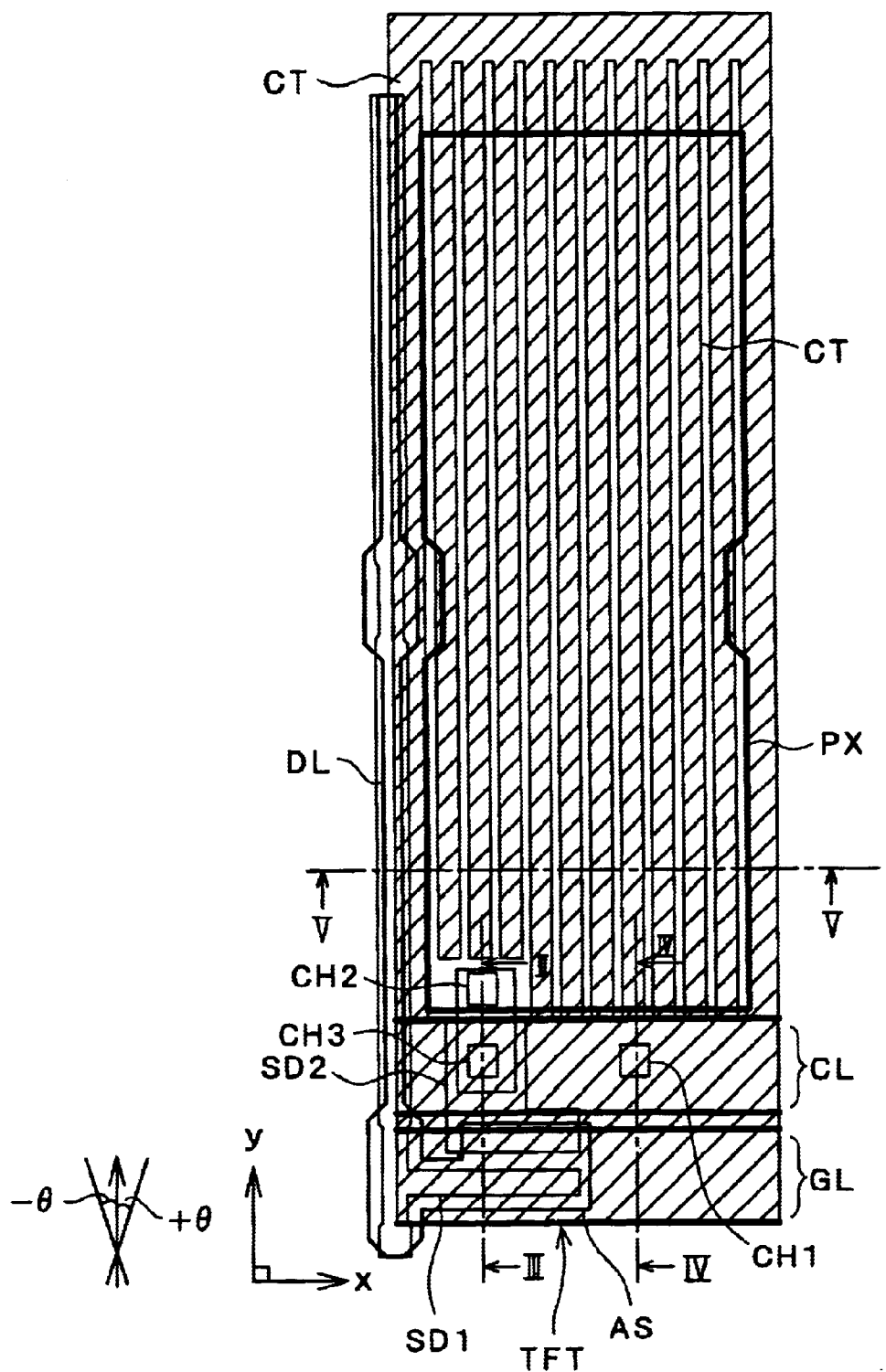
FIG. 1 is a plan view showing the construction of a pixel in one embodiment of a liquid crystal display device according to the invention.
Figure 3:
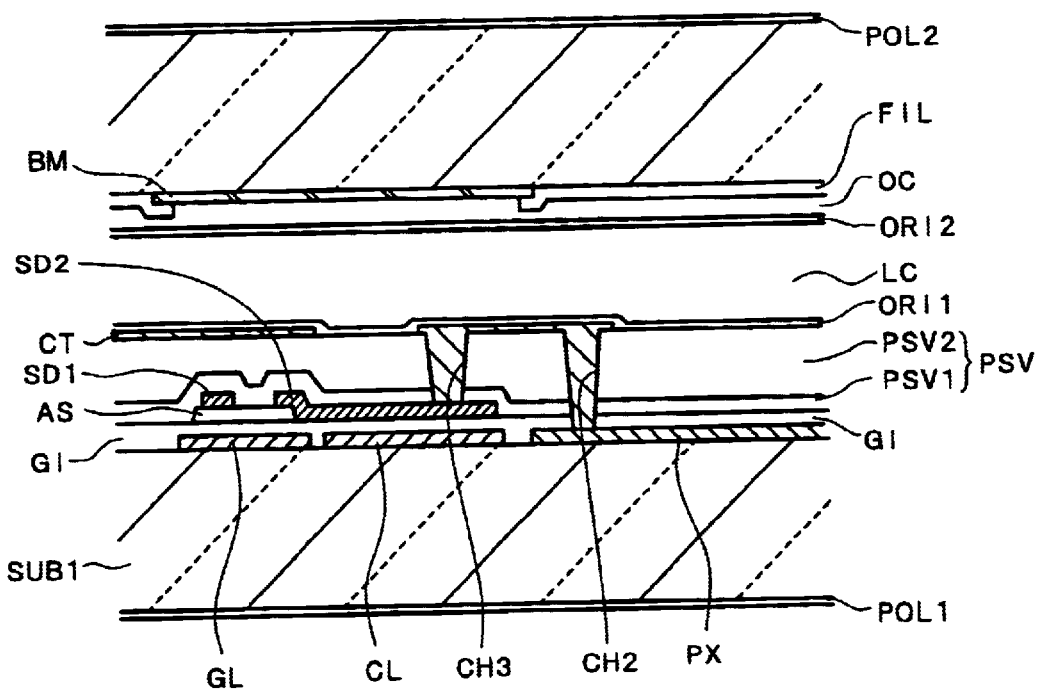
FIG. 3 is a cross-sectional view taken along line III—III of FIG. 1.
Figure 4:
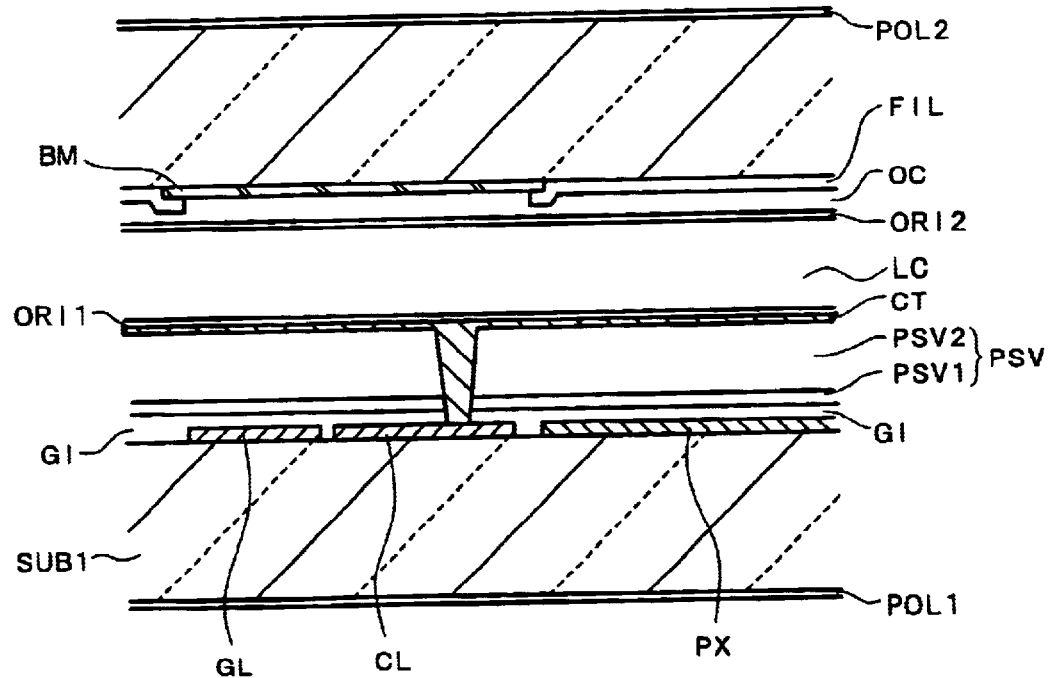
FIG. 4 is a cross-sectional view taken along line IV—IV of FIG. 1.
Figure 5:
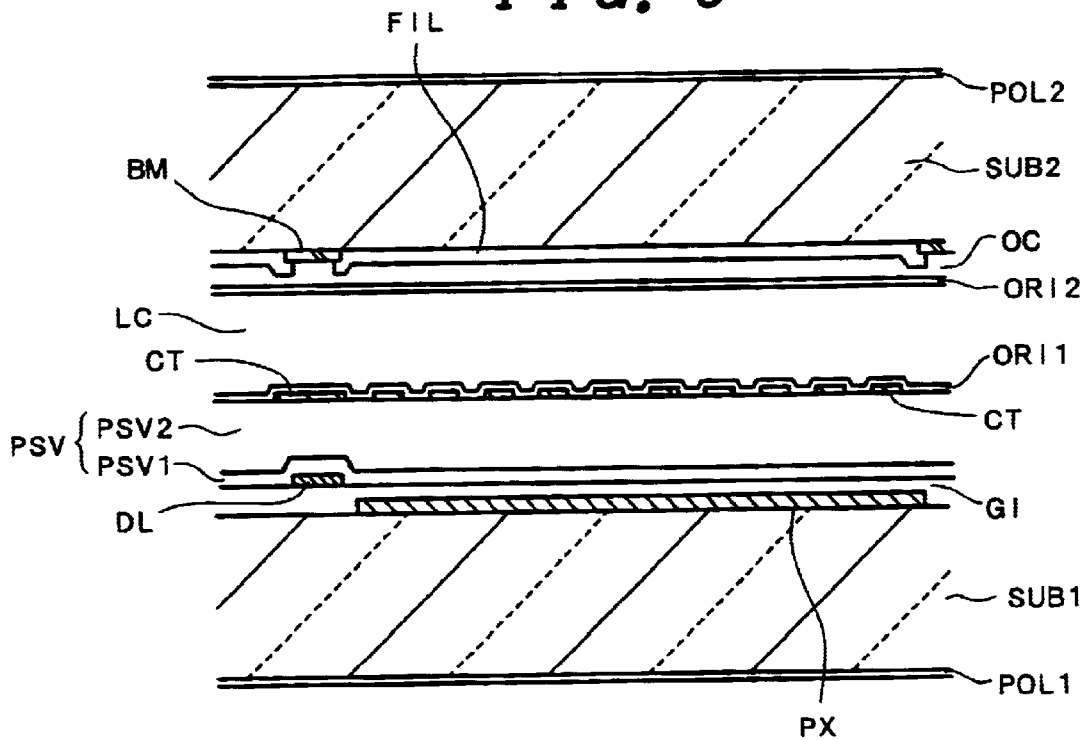
FIG. 5 is a cross-sectional view taken along line V—V of FIG. 1.

FIG. 1 is a plan view showing the construction of a pixel of the above-described liquid crystal display device. FIG. 3 is a cross-sectional view taken along line III—III of FIG. 1; FIG. 4 is a cross-sectional view taken along line IV—IV of FIG. 11; and FIG. 5 is a cross-sectional view taken along line V—V of FIG. 1.

Incidentally, the liquid crystal display device according to this embodiment is constructed to operate in a normally black mode in which a black display is provided when electric fields having components approximately parallel to the transparent substrate SUB1 are not generated between its pixel electrodes PX and its counter electrodes CT, and the normally black mode can be set according to the characteristic of the liquid crystal (in this embodiment, for example, a p-type characteristic), the direction of an electric field between each of the pixel electrodes PX and a corresponding one of the counter electrodes CT, the rubbing direction of an alignment film ORI, and the direction of the axis of transmission of light polarized by a polarizer POL.

Referring first to FIG. 1, a gate signal line GL, which is disposed so as to extend in the x direction of FIG. 3 is formed on the surface of the transparent substrate SUB1 on the bottom side of the illustrated pixel area. This gate signal line GL is made of, for example, Cr or a Cr alloy.

The gate signal line GL is formed to surround the pixel area together with a gate signal line (not shown) which corresponds to a pixel area positioned on the top side of the pixel area, a drain signal line DL which will be described later, and a drain signal line (not shown) which dorresponds to a pixel area positioned on the right-hand side of the illustrated pixel area.

A counter voltage signal line CL which runs in parallel with the gate signal line GL, is formed adjacent thereto. This counter voltage signal line CL is formed at the same time that, for example, the gate signal line GL is formed, and is made of, for example, Cr or a Cr alloy.

The transparent pixel electrode PX, which is made of, for example, an ITO (Indium-Tin-Oxide) film or an IZO (Indium-Zinc-Oxide) film, is formed on the top surface of the transparent substrate SUB1 in such a manner as to avoid an area in which the gate signal line GL and the counter voltage signal line CL are formed. This pixel electrode PX is formed as a plane-shaped electrode which is formed in a large part of the pixel area.

An insulating film GI made of, for example, SiN is formed to cover the gate signal line GL, the counter voltage signal lines CL, the pixel electrode PX and others on the surface of the transparent substrate SUB1 on which the gate signal line GL, the counter voltage signal lines CL and the pixel electrode PX are formed in the above-described manner (refer to FIGS. 3, 4 and 5). This insulating film GI has the function of an interlayer insulating film between the drain signal line DL (which will be described later) and the gate signal line GL as well as the counter voltage signal line CL, the function of a gate insulating film with respect to the thin film transistor TFT, which will be described later, and the function of a dielectric film with respect to the capacitance element Cstg, which also will be described later.

A semiconductor layer AS made of, for example, amorphous Si (a-Si) is formed on the top surface of the insulating film GI in a portion thereof which is superposed on the gate signal line GL. This semiconductor layer AS constitutes a semiconductor layer of the thin film transistor TFT, and a drain electrode SD1 and a source electrode SD2 are formed on the top surface of the semiconductor layer AS, thereby forming a MIS type transistor having a reversed-staggered structure, which uses part of the gate signal line GL as its gate electrode.

Incidentally, the semiconductor layer AS is formed not only in an area in which the thin film transistor TFT is formed, but also in an area in which the drain signal line DL, which will be described later, is formed. The reason for this is to give the semiconductor layer AS, as well as the insulating film GI, the function of an interlayer insulating film between the drain signal line DL and the gate signal line GL, as well as the counter voltage signal line CL.

The drain electrode SD1 of the thin film transistor TFT is formed at the same time as the drain signal line DL, and. at this time, the source electrode SD2 is formed so as to be spaced apart from the drain electrode SD1 by a gap corresponding to the channel length of the thin film transistor TFT.

Specifically, the drain signal line DL, which extends in the y direction in FIG. 1, is formed on the insulating film GI, and part of the drain signal line DL is formed so as to extend onto the top surface of the semiconductor layer AS, whereby the drain electrode SD1 is formed. The drain signal line DL and the drain electrode SD1 are formed of, for example, Cr or a Cr alloy.

In addition, the source electrode SD2, formed at the same time as the drain electrode SD1, is extended so as to project from the area in which the semiconductor layer AS is formed, and this extended portion serves as a contact portion which provides connection to the pixel electrode PX.

The source electrode SD2 has the function of the capacitance element Cstg between the source electrode SD2 and the counter voltage signal line CL.

A protective film PSV, which is made of a stacked structure in which an inorganic film PSV1 made of, for example, SiN and an organic film PSV2 made of, for example, resin film are stacked in that order, is formed to cover the thin film transistor TFT, the drain signal line DL and the pixel electrode PX on the surface of the transparent substrate SUB1 on which the thin film transistor TFT, the drain signal line DL and the pixel electrode PX are formed in the above-described manner (refer to FIGS. 3, 4 and 5). This protective film PSV is formed chiefly in order to prevent the thin film transistor TFT from coming into direct contact with a liquid crystal LC.

The reason why the organic film PSV2 made of resin film is used as a part of the protective film PSV is that, since the dielectric constant of the organic film PSV2 is low, it is necessary to reduce the capacitance which occurs between a signal line positioned to underlie the protective film PSV and an electrode positioned to overlie the protective film PSV.

Accordingly, among the electric fields generated between the pixel electrode PX and the counter electrode CT, which will be described later, electric fields approximately perpendicular to the transparent substrate SUB1 are prevented from easily generating image retention, by the protective film PSV of small dielectric constant.

The organic film PSV2 can be easily made large in film thickness compared to the inorganic film PSV1, and the surface of the organic film PSV2 can be easily made flat compared to the inorganic film PSV1. Accordingly, the organic film PSV2 has the advantage of preventing defective application of an alignment film, which occurs due to steps of edge portions of interconnection lines on the transparent substrate SUB1, an initial alignment defect due to shadows during rubbing, and a switching abnormality (domain) of liquid crystal.

A plurality of stripe-shaped counter electrodes CT which are disposed so as to extend in the y direction and to be juxtaposed in the x direction, as viewed in FIG. 1, are formed on the top surface of the protective film PSV, and these counter electrodes CT are formed of a transparent conductive film, such as an ITO (Indium-Tin-Oxide) film or an IZO (Indium-Zinc-Oxide) film.

These counter electrodes CT are electrically connected to one another in the pattern of being connected to one another in an area superposed on the counter voltage signal line CL, and in this portion, they are connected to the counter voltage signal line CL via a contact hole CH1 formed in the protective film PSV (the organic film PSV2 and the protective film PSV1).

During the formation of the contact hole CH1, a contact hole CH2 and a contact hole CH3 are also formed. The contact hole CH2 exposes a part of the pixel electrode PX, while the contact hole CH3 exposes a part of the extended portion of the source electrode SD2 of the thin film transistor TFT. The pixel electrode PX and the source electrode SD2 of the thin film transistor TFT are connected to each other by a material which constitutes the counter electrode CT.

In addition, a counter electrode CT, which has approximately the same central axis as the drain signal line DL and is wider than the drain signal line DL, is formed over an area in which the drain signal line DL is formed. In other words, this counter electrode CT is formed in the state in which it completely covers the drain signal line DL, so that the drain signal line DL is not exposed when the transparent substrate SUB1 is viewed in a, direction perpendicular thereto.

Although this counter electrode CT is formed of a transparent conductive layer made of, for example, an ITO film, the counter electrode CT functions as a light shielding film which prevents light leakage due to an electric field which drives the liquid crystal in the vicinity of the drain signal line DL.

In other words, as described above, this liquid crystal display device is constructed so as to operate in a normally black mode in which a black display is provided when electric fields having components approximately parallel to the transparent substrate SUB1 are not generated between the pixel electrodes PX and the counter electrodes CT. With this construction, over the counter electrodes CT, a large number of electric fields are generated in directions approximately perpendicular to the transparent substrate SUB1, while electric fields having components approximately parallel to the transparent substrate SUB1 are not generated, whereby black display is provided. The counter electrodes CT can be substituted for a light shielding film.

In addition, the counter electrode CT over the drain signal line DL can terminate electric fields generated from the drain signal line DL, and therefore, it can restrain the electric fields from terminating on the side of the pixel electrode PX adjacent to the drain signal line DL.

In this case, the fact that the protective film PSV is constructed as a stacked structure, in which the protective film PSV2 made of a resin layer of low dielectric constant is used as its upper layer, makes it easy to terminate the electric fields from the drain signal line DL on the side of the counter electrode CT.

Owing to this fact, the pixel electrodes PX enable only electric fields based on video signals transmitted via the thin film transistors TFT to be generated between the pixel electrodes PX and the counter electrodes CT, and electric fields which become noise do not enter from the drain signal lines DL, whereby it is possible to realize a construction which can avoid a display defect.

Furthermore, since the counter electrode CT is formed so as to reach the area in which the drain signal line DL is formed, the distance by which, for example, a set number of electrodes CT are spaced apart from one another becomes large, whereby an improvement in aperture ratio can be realized. An alignment film ORI1, which also covers the counter electrodes CT, is formed on the surface of the transparent substrate SUB1 on which the counter electrodes CT are formed in the above-described manner. This alignment film ORI1 is a film which is in direct contact with the liquid crystal LC so as to restrict the initial alignment direction of the molecules of the liquid crystal LC. In this embodiment, the rubbing direction of the alignment film ORI1 is a +θ direction or a −θ direction with respect to the y direction in FIG. 1. Incidentally, the angle θ is set to be greater than 0° and smaller than 45°, desirably within the range of from 5° to 30°.

Incidentally, a polarizer POL1 is formed on the surface of the transparent substrate SUB1 opposite to the liquid crystal LC, and the direction of the polarization axis of the polarizer POL1 is the same as or perpendicular to the rubbing direction of the alignment film ORI1.

A black matrix BM is formed, so as to separate the individual pixel areas, on the liquid-crystal-side surface of the transparent substrate SUB2 disposed in opposition to the transparent substrate SUB1 constructed in this manner, with the liquid crystal LC being interposed therebetween. This black matrix BM is formed to improve the contrast of the display and to prevent the thin film transistors TFT from being irradiated with external light.

Color filters FIL each having a color common to a respective one of the pixel areas, which are disposed to be juxtaposed in the y direction, are formed on the surface of the transparent substrate SUB2 on which the black matrix BM is formed in the above-described manner. The color filters FIL are also disposed in the order of, for example, red (R), green (G) and blue (B) in the x direction.

A leveling film OC made of, for example, a resin film is formed to cover the black matrix BM and the color filters FIL, and an alignment film ORI2 is formed on a surface of the leveling film OC. The rubbing direction of the alignment film ORI2 is the same as that of the alignment film ORI1 formed on the transparent substrate SUB1.

Incidentally, a polarizer POL2 is formed on the surface of the transparent substrate SUB1 opposite to the liquid-crystal-side surface thereof, and the direction of the polarization axis of the polarizer POL2 is perpendicular to the direction of the polarization axis of the polarizer POL1 formed on the transparent substrate SUB1.

The organic film PSV2 used in this embodiment has another function which serves to improve the reliability of the protective film PSV 1 itself. If the protective film PSV is formed of an inorganic film PSV1 alone, as in the related art devices, a case occurs where part of the wiring material flows into the liquid crystal through fine defects resulting from defective coverage of ends of the interconnection lines, which affects the electro-optical characteristics of the liquid crystal. The occurrence of such a defect can be prevented by introducing the organic film PSV2 which can realize good coverage and a thick film.

In the above description of the embodiment, reference has been made to a liquid crystal display device of the type constructed to operate in a normally black mode. However, it goes without saying that the invention can also be applied to a construction for operating in other than a normally black mode.

Embodiment 2

Figure 6:
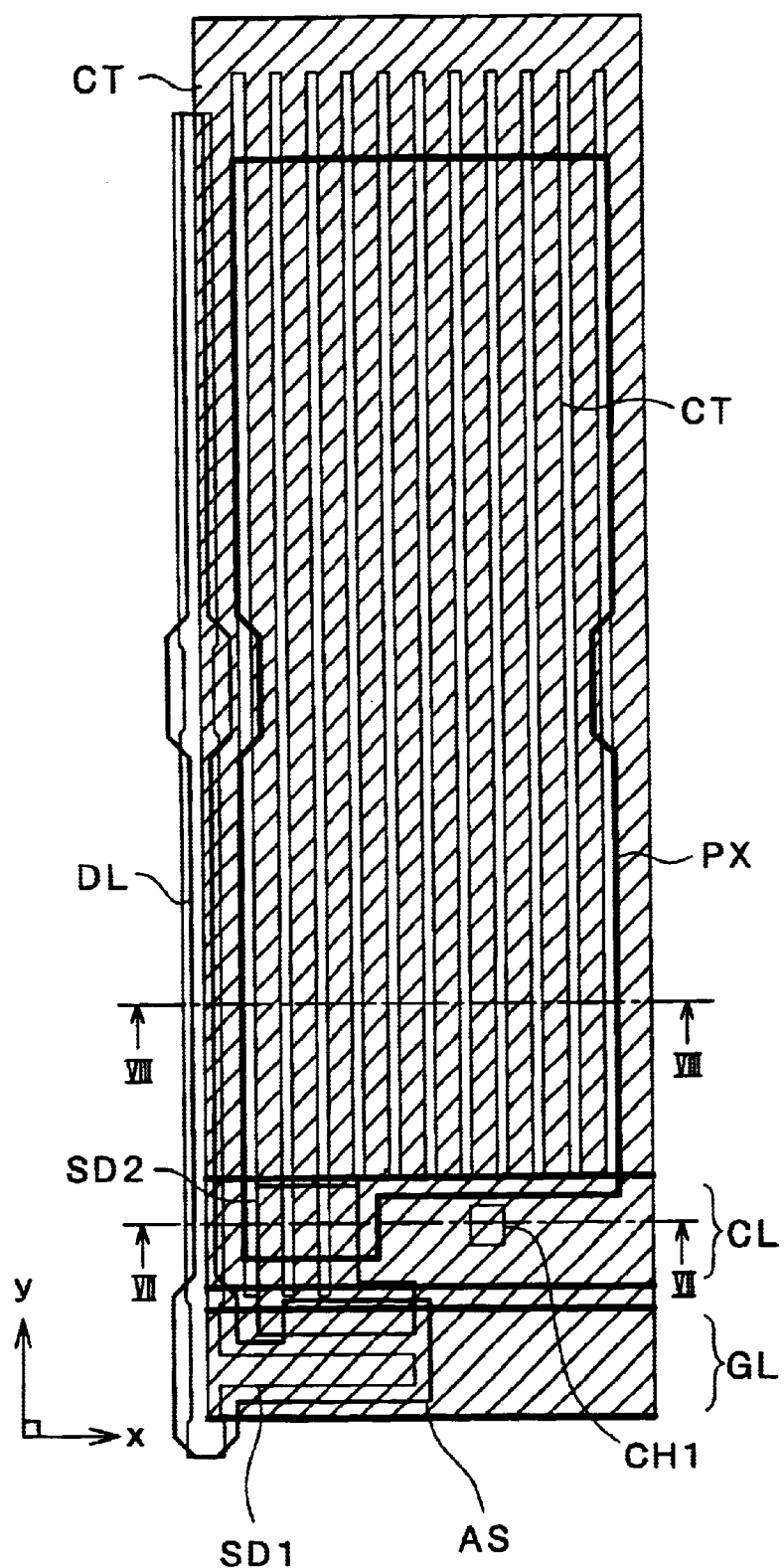
FIG. 6 is a plan view showing the pixel electrode construction in another embodiment of the liquid crystal display device according to the invention.
Figure 7:
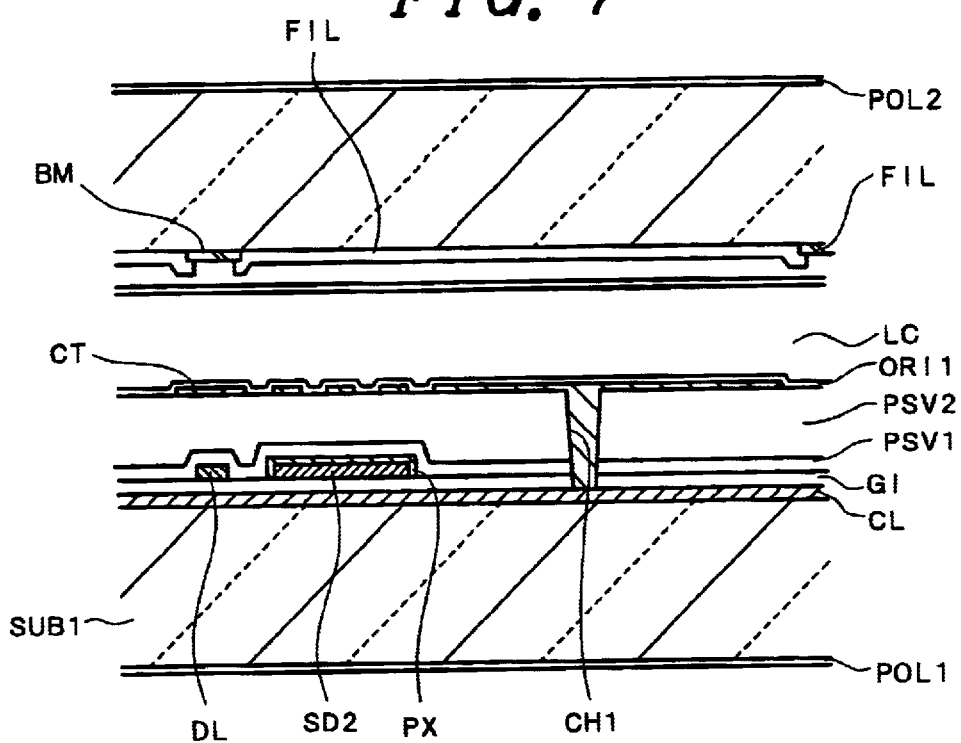
FIG. 7 is a cross-sectional view taken along line VII—VII of FIG. 6.
Figure 8:
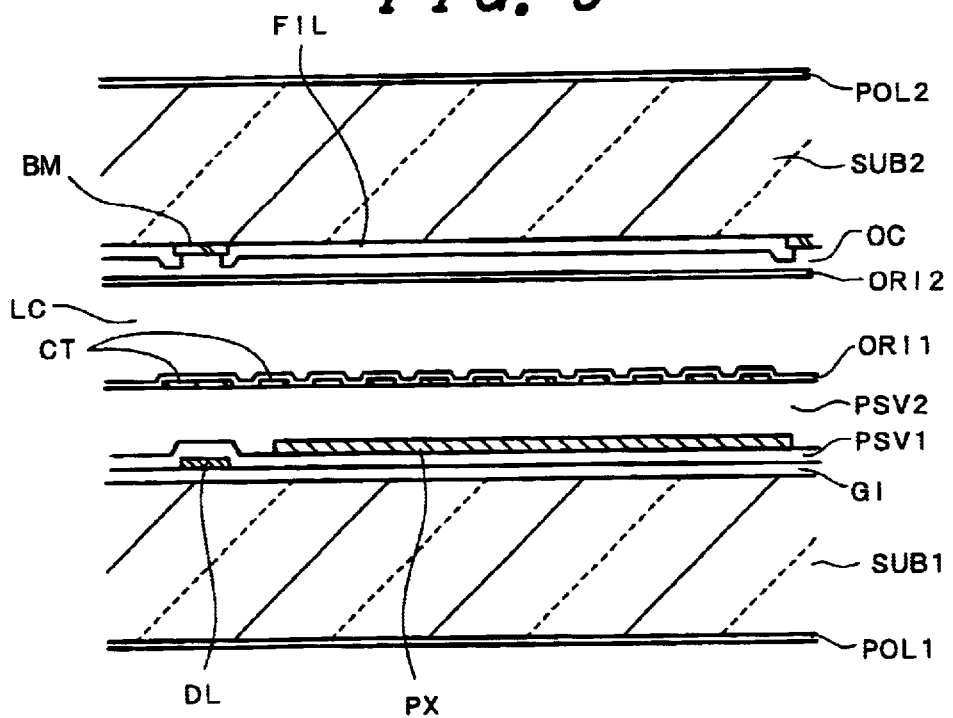
FIG. 8 is a cross-sectional view taken along line VIII—VIII of FIG. 6.

FIG. 6 is a plan view showing the pixel construction of another embodiment of the liquid crystal display device according to the invention, and it is a view corresponding to FIG. 1. FIG. 7 is a cross-sectional view taken along line VII—VII of FIG. 6; and FIG. 8 is a cross-sectional view taken along line VIII—VIII of FIG. 6.

The construction of Embodiment 2 differs from that of Embodiment 1 in that the pixel electrode PX is formed to overlie the insulating film GI and to underlie the protective film PSV. Accordingly, the pixel electrode PX is formed in the same layer as the source electrode SD2 of the thin film transistor TFT, and the pixel electrode PX and the source electrode SD2 are connected to each other without the need for a contact hole.

In other words, an extended portion of the source electrode SD2 is formed and the pixel electrode PX is formed to overlap this extended portion, thereby providing a connection between the extended portion and the pixel electrode PX.

Similarly to the protective film PSV of Embodiment 1, the protective film PSV of Embodiment 2 consists of a stacked structure in which the protective film PSV1, made of an inorganic material layer, and the protective film PSV2, made of an organic material layer, are stacked in that order. Accordingly, the dielectric constant of the protective film PSV can be made small, and the capacitive coupling between the signal line and the counter electrode CT formed on the protective film PSV can be made small.

Embodiment 3

Figure 9:
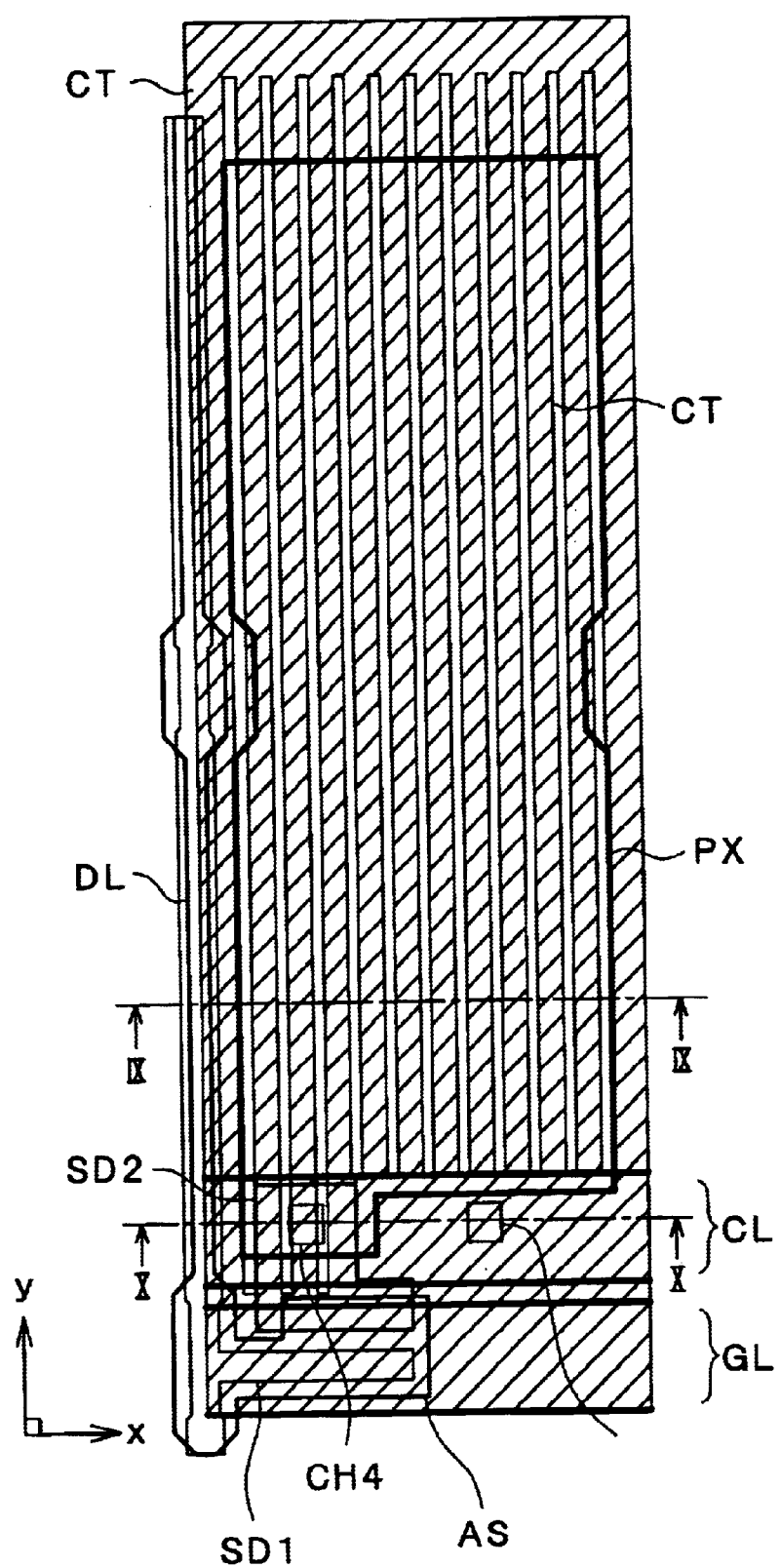
FIG. 9 is a plan view showing the pixel construction in another embodiment of the liquid crystal display device according to the invention.
Figure 10:
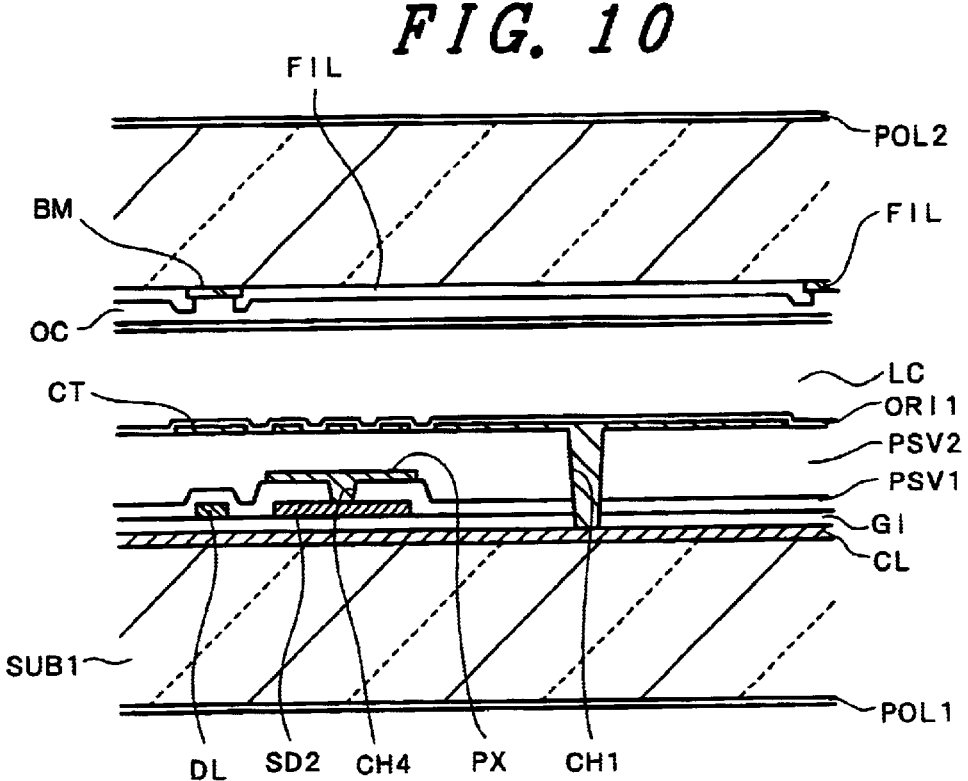
FIG. 10 is a cross-sectional view taken along line X—X of FIG. 9.
Figure 11:
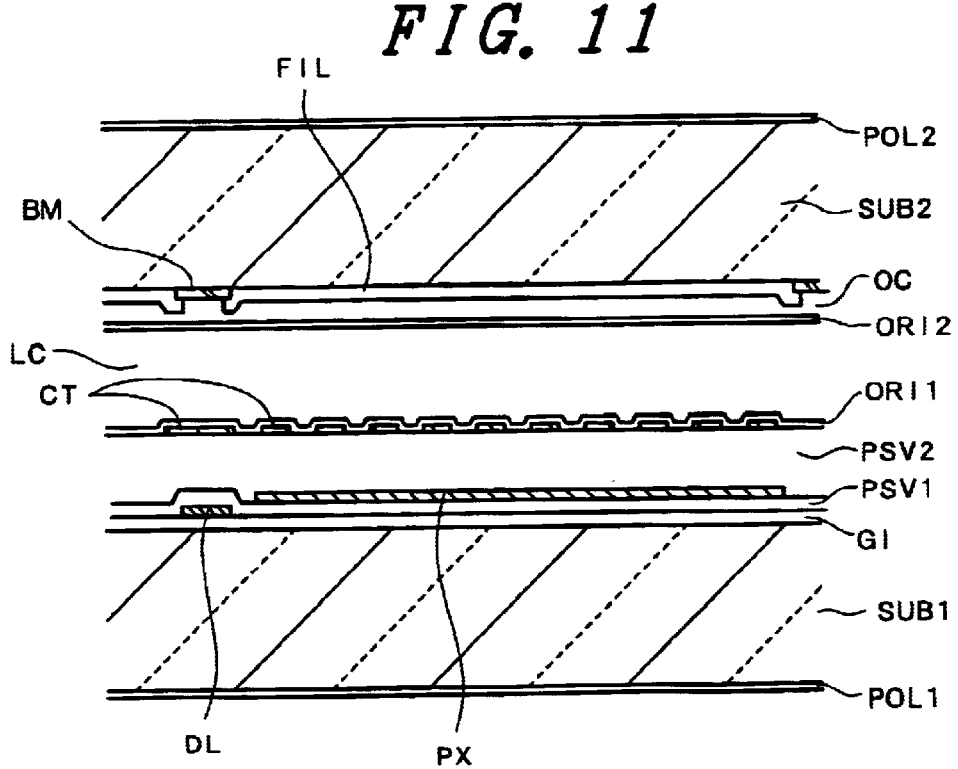
FIG. 11 is a cross-sectional view taken along line XI—XI of FIG. 9.

FIG. 9 is a plan view showing the pixel construction of another embodiment of the liquid crystal display device according to the invention, and it is a view corresponding to FIG. 6. FIG. 10 is a cross-sectional view taken along line X—X of FIG. 9; and FIG. 11 is a cross-sectional view taken along line XI—XI of FIG. 9.

The construction of Embodiment 3 differs from those of Embodiments 1 and 2 in that the pixel electrode PX is formed to overlie the protective film PSV1, made of an inorganic material layer, and to underlie the protective film PSV2, made of an organic material layer.

Accordingly, the pixel electrode PX is formed in a layer different from the source electrode SD2 of the thin film transistor TFT, with the protective film PSV1 made of an inorganic material layer being interposed between the pixel electrode PX and the source electrode SD2. Accordingly, the pixel electrode PX is connected to the source electrode SD2 via the contact hole CH4 formed in the protective film PSV1. Accordingly, only the protective film PSV2 made of an organic material layer is interposed between the pixel electrode PX and the counter electrode CT.

In addition, since this protective film PSV2 can be formed by applying an organic material, the thickness of the protective film PSV2 can be easily made large. Accordingly, for example, by making the thickness of the protective film PSV2 larger than that of the inorganic material layer, it is possible to minimize the capacitive coupling between a signal line and the counter electrode CT.

As is apparent from the foregoing description, in the liquid crystal display device according to the invention, it is possible to restrain the occurrence of image retention. In addition, it is possible to realize an improvement in aperture ratio.

What is claimed is:

1. A liquid crystal display device comprising, in each pixel area on a liquid-crystal-side surface of one of substrates disposed in opposition to each other with a liquid crystal interposed therebetween:

a thin film transistor to be driven by supply of a scanning signal from a gate signal line;

a pixel electrode to be supplied with a video signal from a drain signal line via the thin film transistor; and a counter electrode which causes an electric field to be generated between the counter electrode and the pixel electrode, the counter electrode being formed in a layer overlying the pixel electrode with a stacked insulating film interposed between the counter electrode and the pixel electrode, the stacked insulating film being made of a stacked structure in which an insulating film including a part of a gate insulating film of the thin film transistor, an inorganic material layer and an organic material layer are stacked in that order, the counter electrode being made of a plurality of stripe-shaped counter electrodes which are disposed to be extended in one direction and to be juxtaposed in a direction transverse to the one direction, and the pixel electrode being made of a transparent plane-shaped electrode which is formed in a large part of the pixel area.

2. A liquid crystal display device according to claim 1, wherein a counter voltage signal line is formed in the same layer as the pixel electrode and is connected to the counter electrode through a through-hole formed in the stacked insulating film.

3. A liquid crystal display device according to claim 1, wherein the pixel electrode is connected to a source electrode of the thin film transistor through a through-hole formed in the stacked insulating film formed in the layer overlying the pixel electrode and a through-hole formed in a protective film formed in a layer overlying the source electrode of the thin film transistor.

4. A liquid crystal display device according to claim 1, wherein the plurality of counter electrodes are formed to extend approximately in parallel with the drain signal line and include a counter electrode which is superposed on the drain signal line and which has a central axis approximately coincident with a central axis of the drain signal line and is wider than the drain signal line.

5. A liquid crystal display device comprising, in each pixel area on a liquid-crystal-side surface of one of substrates disposed in opposition to each other with a liquid crystal interposed therebetween:

a thin film transistor to be driven by supply of a scanning signal from a gate signal line;

a pixel electrode to be supplied with a video signal from a drain signal line via the thin film transistor; and a counter electrode which causes an electric held to be generated between the counter electrode and the pixel electrode, the counter electrode being formed in a layer overlying pixel electrode with an interposed film interposed between at least a portion of counter electrode and at least a portion of the pixel electrode, the interposed film including at least an organic material layer, the counter electrode being made of a plurality of stripe-shaped counter electrodes which are disposed to be extended in one direction and to be juxtaposed in a direction transverse to the one direction, and the pixel electrode being made of a transparent plane-shaped electrode which is formed in a large Dart of the pixel area;

wherein the pixel electrode is formed on an insulating film including a part of a gate insulating film of the thin film transistor, and a counter voltage signal line is formed in a layer underlying the insulating film, the counter voltage signal line being connected to the counter voltage through a through-hole extended through the interposed film and the insulating film.

6. A liquid crystal display device comprising, in each pixel area on a liquid-crystal-side surface of one of substrates disposed in opposition to each other with a liquid crystal interposed therebetween:

a thin film transistor to be driven by supply of a scanning signal from a gate signal line;

a pixel electrode to be supplied with a video signal from a drain signal line via the thin film transistor; and a counter electrode which causes an electric field to be generated between the counter electrode and the pixel electrode, the counter electrode being formed in a layer overlying pixel electrode with an interposed film interposed between at least a portion of counter electrode and at least a portion of the pixel electrode, the interposed film including at least an organic material layer, the counter electrode being made of a plurality of stripe-shaped counter electrodes which are disposed to be extended in one direction and to be juxtaposed in a direction transverse to the one direction, and the pixel electrode being made of a transparent plane-shaped electrode which is formed in a large part of the pixel area;

wherein the plurality of counter electrodes are formed to extend approximately in parallel with the drain signal line and include a counter electrode which is superposed on the drain signal line and which has a central axis approximately coincident with a central axis of the drain signal line and is wider than the drain signal line.

7. A liquid crystal display device comprising, in each pixel area on a liquid-crystal-side surface of one of substrates disposed in opposition to each other with a liquid crystal interposed therebetween:

a thin film transistor to be driven by supply of a scanning signal from a gate signal line;

a pixel electrode to be supplied with a video signal from a drain signal line via the thin film transistor; and a counter electrode which causes an electric field to be generated between the counter electrode and the pixel electrode, the pixel electrode being made of a transparent plane-shaped electrode which is formed in a large part of the pixel area on a first protective film made of an inorganic material layer formed to cover the thin film transistor and is connected to a source electrode of the thin film transistor through a contact hole formed in the first protective film, the counter electrode being made of a plurality of electrodes which are formed on a second protective film made of an organic material layer formed to cover the pixel electrode on the first protective film and which are disposed to be extended in one direction and to be juxtaposed in a direction transverse to the one direction.

8. A liquid crystal display device according to claim 7, wherein the counter electrode is made of a transparent conductive material.

9. A liquid crystal display device according to claim 7, where the plurality of electrodes include a counter electrode which has approximately the same center line as the drain signal line and is superposed thereon, the counter electrode being formed to be greater in width than the drain signal line.

10. A liquid crystal display device comprising, in each pixel area on a liquid-crystal-side surface of one of substrates disposed in opposition to each other with a liquid crystal interposed therebetween:

a thin film transistor to be driven by supply of a scanning signal from a gate signal line;

a pixel electrode to be supplied with a video signal from a drain signal line via the thin film transistor; and a counter electrode which causes an electric field to be generated between the counter electrode and the pixel electrode, the counter electrode being formed in a layer overlying pixel electrode with an interposed film interposed between at least a portion of counter electrode and at least a portion of the Pixel electrode, the interposed film including at least an organic material layer, the counter electrode being made of a plurality of stride-shaped counter electrodes which are disposed to be extended in one direction and to be Juxtaposed in a direction transverse to the one direction, and the pixel electrode being made of a transparent plane-shaped electrode which is formed in a large Dart of the pixel area, wherein the interposed film is at least one of a protective film and an insulating film; and wherein the interposed film include a stacked structure in which an inorganic material layer and the organic material layer are stacked in that order.

11. A liquid crystal display device according to claim 10, wherein the interposed film is a protective film.

12. A liquid crystal display device according to claim 10, wherein the interposed film made of the stacked structure further includes an insulating film including a part of a gate insulating film of the thin film transistor, the inorganic material layer and the organic material layer stacked in that order.

13. A liquid crystal display device comprising, in each pixel area on a liquid-crystal-side surface of one of substrates disposed in opposition to each other with a liquid crystal interposed therebetween:

a thin film transistor to be driven by supply of a scanning signal from a gate signal line;

a pixel electrode to be supplied with a video signal from a drain signal line via the thin film transistor; and a counter electrode which causes an electric field to be generated between the counter electrode and the pixel electrode, the counter electrode being formed in a layer overlying pixel electrode with an interposed film interposed between at least a portion of counter electrode and at least a portion of the pixel electrode, the interposed film including at least an organic material layer, the counter electrode being made of a plurality of stripe-shaped counter electrodes which are disposed to be extended in one direction and to be juxtaposed in a direction transverse to the one direction, and the pixel electrode being made of a transparent plane-shaped electrode which is formed in a large Dart of the pixel area, wherein the interposed film is at least one of a protective film and an insulating film; and wherein the interposed film includes a first protective film made of an inorganic material layer formed to cover the thin film transistor, and a second protective film made of the organic material layer formed to cover the pixel electrode on the first protective film.

* * * * *